No. 836,550. PATENTED NOV. 20, 1906.
J. WELFLE.
GRAIN FEEDER.
APPLICATION FILED JAN. 22, 1906.
2 SHEETS—SHEET 1.
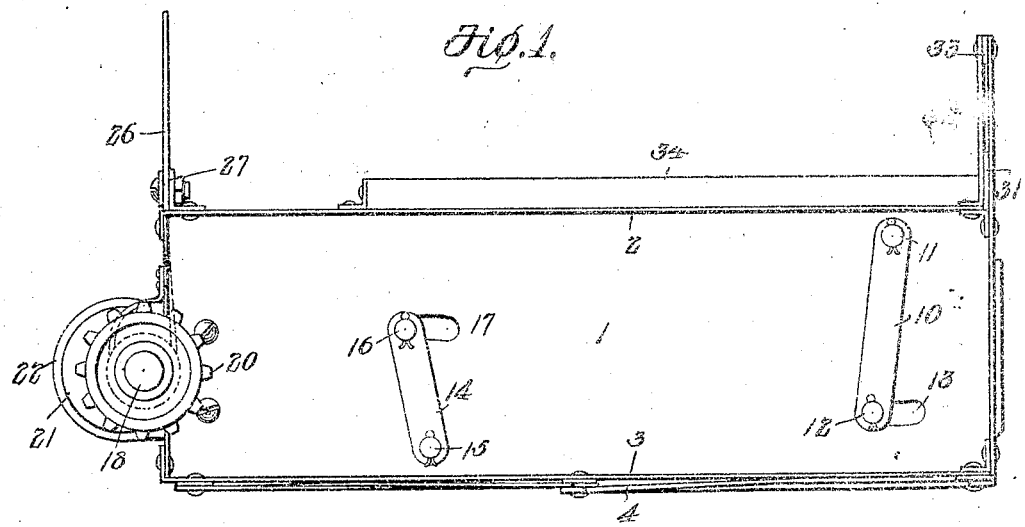
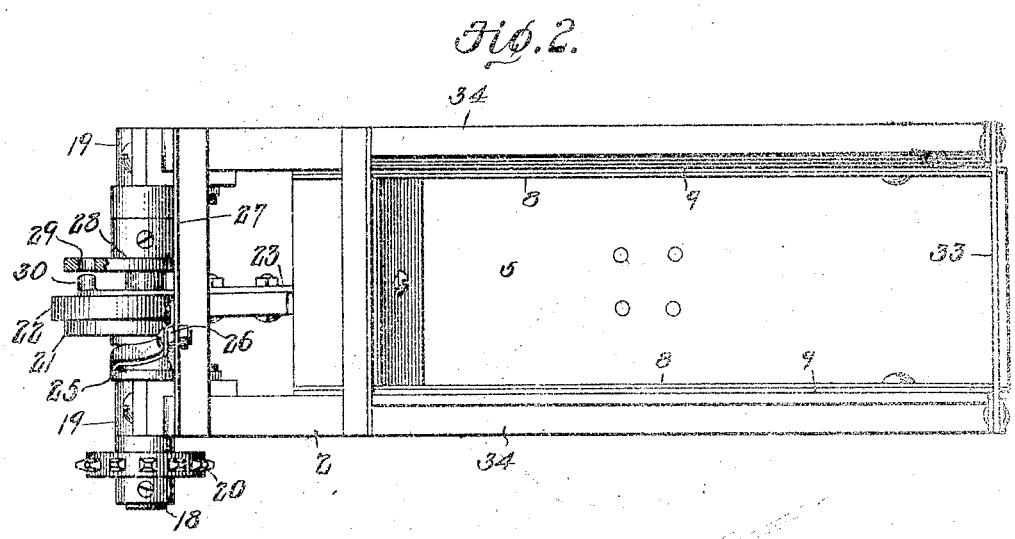
WITNESSES:
Joseph Welfle,
INVENTOR.
By
ATTORNEYS No. 836,550. PATENTED NOV. 20, 1906.
J. WELFLE.
GRAIN FEEDER.
APPLICATION FILED JAN. 22, 1906.
2 SHEETS—SHEET 2.
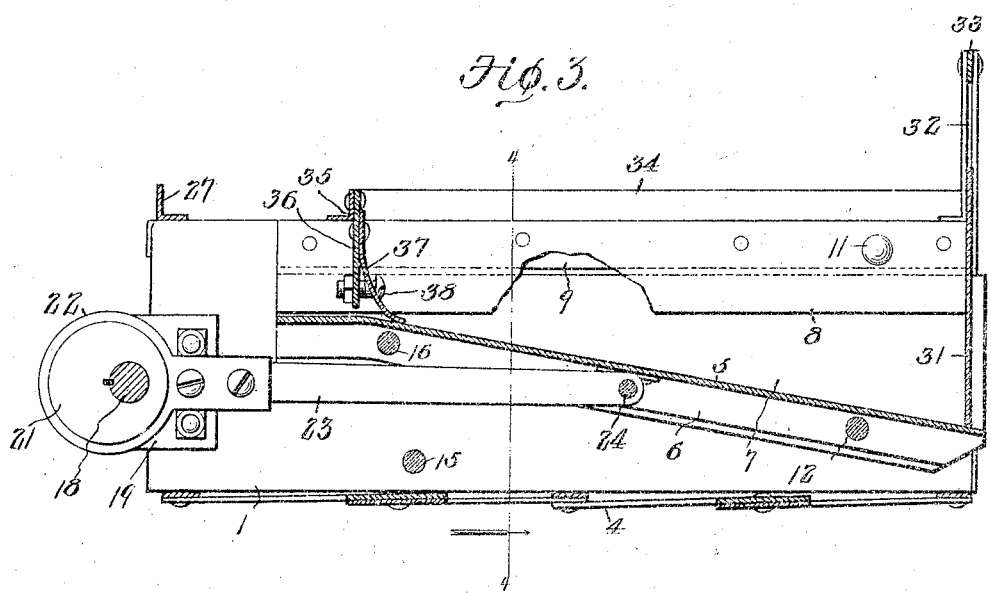
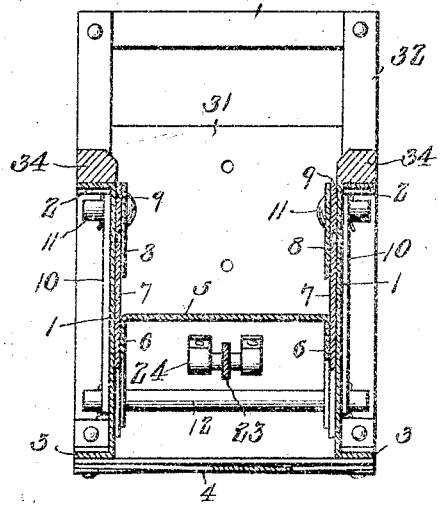

UNITED STATES PATENT OFFICE.

JOSEPH WELFLE, OF HAMLER, OHIO.

GRAIN-FEEDER.

No. 836,550.  Specification of Letters Patent.  Patented Nov. 20, 1906.

Application filed January 22, 1906. Serial No. 297,332.

*To all whom it may concern:*

Be it known that I, JOSEPH WELFLE, a citizen of the United States, residing at Hamler, in the county of Henry and State of Ohio, have invented a new and useful Grain-Feeder, of which the following is a specification.

This invention relates to grain-feeders, and has for its object to facilitate the introduction of grain into grain-fans and the like; to conveniently regulate the discharge of grain therefrom; to mount the shaking-pan in a new and novel manner so as to prevent choking thereof by the grain, and to control the operation of the shaking-pan without stopping the engine or other source of power to which the feeder is connected.

With these and other objects in view the present invention consists in the combination and arrangement of parts as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a grain-feeder embodying the features of the present invention. Fig. 2 is a top plan view thereof. Fig. 3 is a longitudinal sectional view of the device. Fig. 4 is a cross-sectional view on the line 4 4 of Fig. 3.

Like characters of reference designate corresponding parts in all of the figures of the drawings.

The present device includes a hopper-frame made up of upstanding longitudinal sides 1, preferably metal plates having their upper and lower edges flanged, as at 2 and 3, with the flanges extending outwardly. These side plates are connected across their bottoms by means of lattice-work 4, so as to leave the bottom of the hopper open to give access to the interior thereof.

Within the hopper is a shaking-pan comprising a bottom 5, inclined to the vertical and provided at each longitudinal edge with a depending flange 6. Each side 7 of the pan is riveted or otherwise secured to the adjacent flange 6 and rises a suitable distance thereabove, but terminates short of the top of the hopper. Downwardly-extending guard-plates 8 are secured to the inner faces of the sides 1 of the hopper at their upper ends by fastenings 11, said plates being offset or spaced away from the sides 1, for instance, by spacing-strips 9 so as to overlap the upper edges of the sides of the pan, and thereby close the space between the upper edges of the sides of the pan and the hopper, which renders the pan grain-tight throughout its sides. Said guard-plates 8 extend in the line of direction of the movement of the pan.

The pan is mounted to reciprocate and is supported at its lower end by means of a pair of links 10 upon the exterior of the hopper, with their upper ends loosely hung from suitable fastenings 11, piercing the sides of the hopper above the pan. A cross-bar 12 extends transversely beneath the bottom of the pan and pierces its flanges 6, the extremities of the bar working in arcuate slots 13, formed in the sides of the hopper and struck from the pivotal support 11 as a center, said extremities of the bar also piercing the lower ends of the links 10. A similar but reversely-disposed means is employed for supporting the elevated end of the shoe and includes a link 14 at each side of the hopper, with its lower ends pivotally supported upon a cross-bar 15, piercing the lower portions of the sides of the hopper. A cross-bar 16 pierces the flanges 6 of the pan, with its ends working in arcuate slots 17 in the sides of the hopper and connected to the upper ends of the links 14.

For the purpose of working the pan back and forth the shaft 18 is mounted transversely across the front end of the hopper in suitable bearings 19, one end of the shaft being projected beyond the hopper and provided with a drive-wheel 20, which may be a sprocket-wheel or belt-pulley, as desired. Mounted to slide upon the shaft is an eccentric 21, embraced by an eccentric-strap 22, from which an eccentric-rod 23 extends beneath the bottom of the pan to which it is connected, as at 24. The eccentric 21 is provided with a hub 25, having an annular groove for the forked lower end of an upstanding lever 26, fulcrumed upon a cross-bar 27, extending across the top of the hopper at its forward end. A clutch member 28 is fixed upon the shaft at one side of the eccentric and is provided with an opening 29 for the reception of a stud or projection 30, carried by the eccentric. When the eccentric is shifted by the lever 26 to bring its projection 30 into engagement with the opening 29 in the fixed clutch member 28, the shaft 18 will be thrown into operation and the pan thereby reciprocated within the hopper. The operation of the pan can be stopped by throwing out the clutch, which obviates the necessity of stopping the engine or other source of power from which the feeder is being driven.

At the rear or discharge end of the hopper there is an upstanding gate 31, mounted in guideways 32, rising above the top of the hopper and connected at their upper ends by a cross-bar 33. The opening and closing of this gate is controlled in any suitable manner, preferably by an overhead lever, (not shown,) which is suitably connected to the guide for raising and holding the same elevated.

Wooden beams or bars 34 are secured to the flanges 2 upon the top edges of the sides 1 of the hopper and terminate short of the front end of the hopper in abutment with a cross-bar 35, extending across the hopper. The inner longitudinal corners of these bars are beveled, as best indicated in Fig. 4, and the function of these bars is to prevent injury to the baskets or other receptacles which are rested upon the upper edges of the hopper when dumping grain into the pan.

It will of course be understood that as the bottom of the pan is inclined downwardly and rearwardly the grain will be worked in that direction and discharged beneath the bottom of the gate 31 when the latter is elevated. However, it is necessary to close the elevated end of the pan, so as to prevent escape of grain at this point. In addition to closing the upper end of the pan I propose to have the closure stationary, so as to operate as a follower for pushing forwardly such grain as may collect in the upper portions of the pan. In carrying out this feature I suspend a plate 36 from the cross-bar 35, and to this plate there is secured an elastic plate 37, which is bowed downwardly and forwardly, with its lower free edge resting upon the bottom of the pan. A threaded adjusting device 38 pierces the lower portions of the two plates, whereby the shoe 37 may be drawn toward the plate 36, so as to maintain the free yieldable edge of the shoe in frictional engagement with the bottom of the pan, thereby to close the rear end of the pan and prevent grain working out.

Having thus described the invention, what is claimed is—

1. In a grain-feeder the combination of a hopper, a reciprocating pan working in the hopper, a stationary spring-shoe carried by the hopper and located within the upper end of the pan in engagement along its entire lower edge with the bottom thereof, and means connected with said hopper and shoe to adjust the tension of the spring of said shoe.

2. In a grain-feeder, the combination of a hopper, a reciprocating pan working therein, a cross-bar for the hopper above the pan, a plate suspended from the cross-bar and located within the pan, a shoe hung from the upper portion of the plate and inclined downwardly and forwardly into engagement with the bottom of the pan, and adjusting means connecting the shoe and the plate for drawing the former toward the plate to maintain the shoe engaged with the pan.

In testimony that I claim the foregoing as my own I have hereto affixed my signature in the presence of two witnesses.

JOSEPH WELFLE.

Witnesses:
J. C. WILHELM,
AUGUST FROSS.